(12) United States Patent
Kim

(10) Patent No.: US 7,951,476 B2
(45) Date of Patent: May 31, 2011

(54) RECHARGEABLE BATTERY USING AN ELECTRODE ASSEMBLY HAVING AT LEAST ONE INSULATING PLATE

(75) Inventor: Daekyu Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1044 days.

(21) Appl. No.: 11/727,474

(22) Filed: Mar. 27, 2007

(65) Prior Publication Data

US 2007/0224494 A1    Sep. 27, 2007

(30) Foreign Application Priority Data

Mar. 27, 2006  (KR) .................. 10-2006-0027528

(51) Int. Cl.
*H01M 2/08* (2006.01)
*H01M 2/18* (2006.01)
(52) U.S. Cl. ..................... 429/94; 429/140; 429/185
(58) Field of Classification Search .............. 429/94, 429/185, 140
See application file for complete search history.

(56) References Cited

FOREIGN PATENT DOCUMENTS

| JP | 05074444 A | * | 3/1993 |
|----|------------|---|--------|
| JP | 09035751 A | * | 2/1997 |
| JP | 09-270272  |   | 10/1997 |
| JP | 10-247524  |   | 9/1998 |
| JP | 2002-124293 |  | 4/2002 |
| JP | 2004014374 A | * | 1/2004 |

* cited by examiner

*Primary Examiner* — Tracy Dove
(74) *Attorney, Agent, or Firm* — Lee & Morse, P.C.

(57) ABSTRACT

An electrode assembly for a rechargeable battery resists external impacts applied to the rechargeable battery, and includes a sealing tape attached to an outer circumference of the rechargeable battery, which extends toward an upper part and a lower part to prevent the electrode assembly from unfastening, and a top insulating plate and a bottom insulating plate may be attached to the extended portion of the sealing tape. A shock resistant electrode assembly for a rechargeable battery has an insulating plate attached thereto by an extended portion of a sealing tape, thereby preventing the electrode assembly from moving in a battery housing when an external impact is applied.

18 Claims, 4 Drawing Sheets

RECHARGEABLE BATTERY USING AN ELECTRODE ASSEMBLY HAVING AT LEAST ONE INSULATING PLATE

BACKGROUND OF THE INVENTION

1. Field of the Invention

The present invention relates to an electrode assembly for a rechargeable battery, a rechargeable battery using the electrode assembly, and a fabricating method thereof. More particularly, the present invention relates to an electrode assembly for a rechargeable battery, which may prevent the electrode assembly from moving in a battery housing, e.g., a can, by not allowing the electrode assembly to unfasten when an external impact is applied.

2. Description of the Related Art

In general, as portable electronic apparatuses, e.g., video cameras, mobile phones, portable computers, etc., have continued to progress and become more light weight with increased high technology content, extensive research in the field of rechargeable batteries used as power sources has been made. Rechargeable batteries may include, e.g., a nickel-cadmium batteries, a nickel-metal hydride batteries, a nickel-zinc batteries, lithium rechargeable batteries, etc. Among these types of batteries, the lithium rechargeable batteries, which may be made in a small size with a high capacity, have come into widespread use in the field of high-tech electronics due to advantages which may include high operation voltage and high energy density per unit weight.

An electrode assembly in a can, i.e., a container, may transform or rotate when an external impact, e.g., from a dropped battery, is applied to the lithium rechargeable battery. Lithium rechargeable batteries which are being used for electric tools may possibly have the upper part and the lower part of the electrode assembly transform or deteriorate from vibrations transferred to the lithium rechargeable battery when the electric tool is operating.

Workers may also handle electric tools carelessly, and the possibility of electrode assembly damage may thus increase. Transformation or dislocation of the upper and lower part of the electrode assembly may generate a short circuit, and the increased internal resistance may cause a problem by generating heat.

One safety test for a battery is a drum test for determining whether an electrode assembly is transformed, dislocated or rotated by measuring the internal resistance, after the battery is moved up, down, right and left in the octagon-shaped drum. When the battery undergoes the drum test, the electrode assembly is moved up and down, and the welded region of an electrode tab may be deintercalated, thereby substantially increasing internal resistance. As a result, there is a need for new battery electrode technologies that address and overcome the problems and shortcomings of prior art batteries.

SUMMARY OF THE INVENTION

The present invention is therefore directed to an electrode assembly for a rechargeable battery and a method for making thereof, which substantially overcomes one or more of the problems due to the limitations and disadvantages of the related art.

It is therefore a feature of an embodiment of the present invention to provide an electrode assembly that does not move in a battery housing in response to an external impact.

It is therefore a feature of an embodiment of the present invention to prevent transformation or damage to an electrode assembly by movement of the electrode assembly.

It is therefore a feature of an embodiment of the present invention to prevent an internal short circuit due to transformation or damage of an electrode assembly.

It is therefore a feature of an embodiment of the present invention to prevent a welded region of an electrode tab from deintercalating, thereby preventing internal resistance from increasing.

It is therefore a feature of an embodiment of the present invention to manufacture a battery suitable as a power supply for electric tools, which generate large vibrations.

At least one of the above and other features and advantages of the present invention may be realized by providing an electrode assembly for rechargeable battery which may include a positive electrode plate, a negative electrode plate and a separator between the positive electrode and the negative electrode, and the separator may include sealing tape attached a circumference of the electrode assembly, and at least one insulating plate may be positioned on at least one of an upper part or a lower part of the electrode assembly, and the insulating plate may be fixed to the electrode assembly by the sealing tape.

The insulating plate may include an upper surface, a lower surface and a side surface, and the sealing tape may be attached to the side of the insulating plate. The sealing tape may extend longer than the length of the electrode assembly in at least one of an upper direction or in a lower direction. The sealing tape may extend as far as a thickness of the insulating plate installed on the upper part of the electrode assembly when extending to the upper part of the electrode assembly, and the sealing tape may extend as much as the thickness of the insulating plate installed on the lower part of the electrode assembly when extending to the lower part of the electrode assembly. Multiple holes may be formed on the insulating plate. The electrode assembly may be applied to a cylinder-shaped rechargeable battery. The insulating plate may be formed from polyolefin.

At least one of the above and other features and advantages of the present invention may be realized by providing a rechargeable battery that may include an electrode assembly, a battery housing receiving the electrode assembly and a cap assembly sealing the battery housing. Sealing tape may be attached to a circumference of the electrode assembly, and at least one insulating plate may be placed at least one of an upper part or a lower part of the electrode assembly, and the insulating plate may be fixed to the electrode assembly by the sealing tape.

At least one of the above and other features and advantages of the present invention may be realized by providing a method for fabricating a rechargeable battery which may include positioning at least one insulating plate on at least one of an upper part or a lower part of an electrode assembly, attaching a sealing tape to a side of the insulating plate and to a circumference of the electrode assembly, inserting the electrode assembly having the sealing tape into a battery housing, and sealing the battery housing by sealing an upper opening of the battery housing with a cap assembly.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
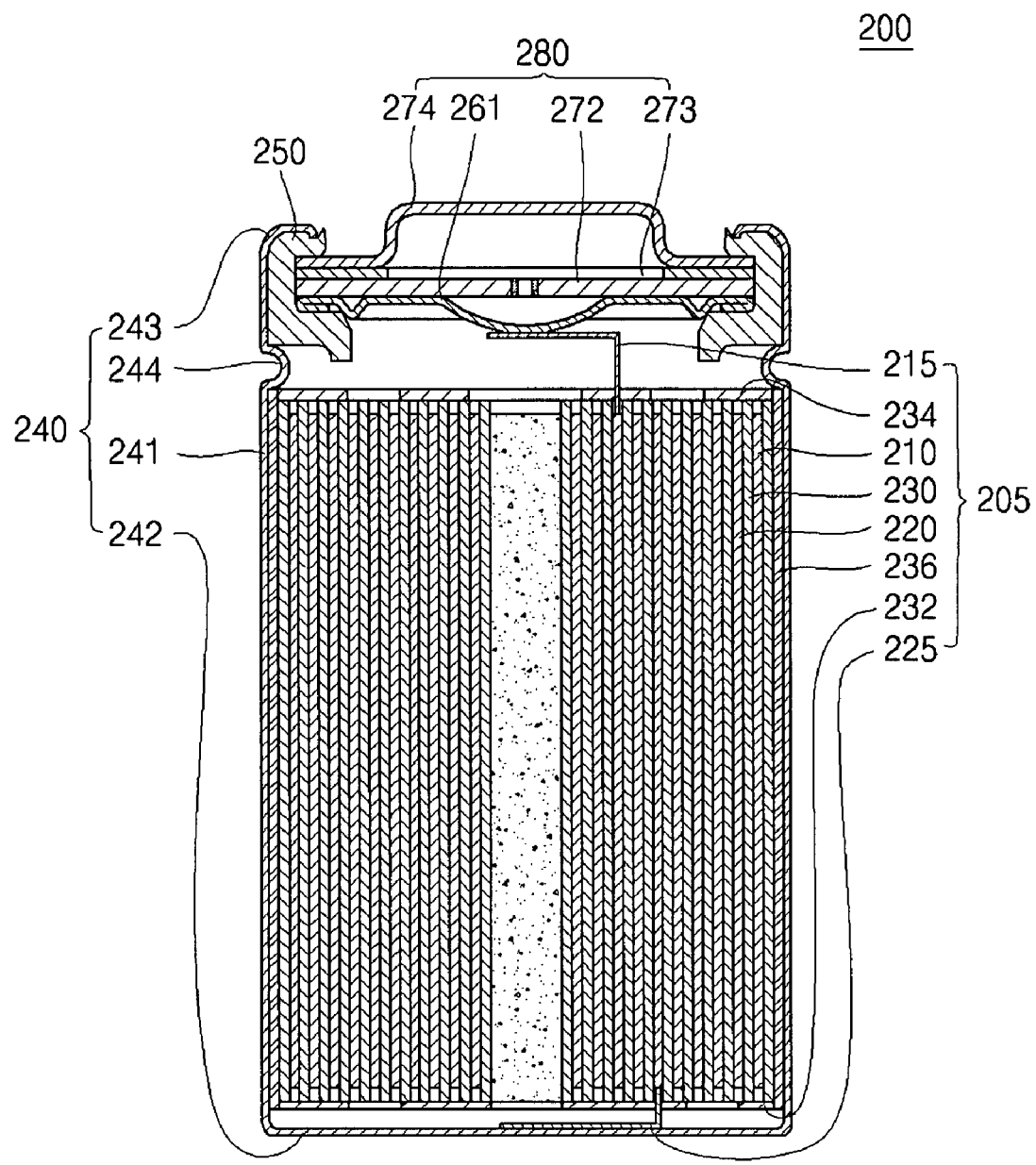
FIG. 1 illustrates a longitudinal sectional view of a lithium rechargeable battery according to an exemplary embodiment of the present invention.

Korean Patent Application No. 10-2006-0027528, filed on Mar. 27, 2006, in the Korean Intellectual Property Office, and entitled: "Electrode Assembly for Rechargeable Battery and Rechargeable Battery Using It, and the Fabricating Method Thereof," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

The rechargeable battery of the present invention may have an advantage of preventing an electrode assembly from moving when external impacts such as vibrations are applied, since a top insulating plate and a bottom insulating plate are fixed respectively to the upper part and the lower part of an electrode assembly by sealing tape.

The present invention may prevent an electrode assembly from transforming or deforming due to the electrode assembly movement, thus preventing an internal short circuit from occurring due to the electrode assembly transformation of deformation.

The present invention may additionally have the advantage of preventing internal resistance of a battery from increasing by not allowing the welded region of an electrode tab to become detached.

In addition, the present invention may have the advantage that the battery is applicable to powering electric tools, which generate large vibrations when operating.

Hereinafter, preferred embodiments of the present invention will be described in detail with reference to the accompanying drawings.

Figure 2:
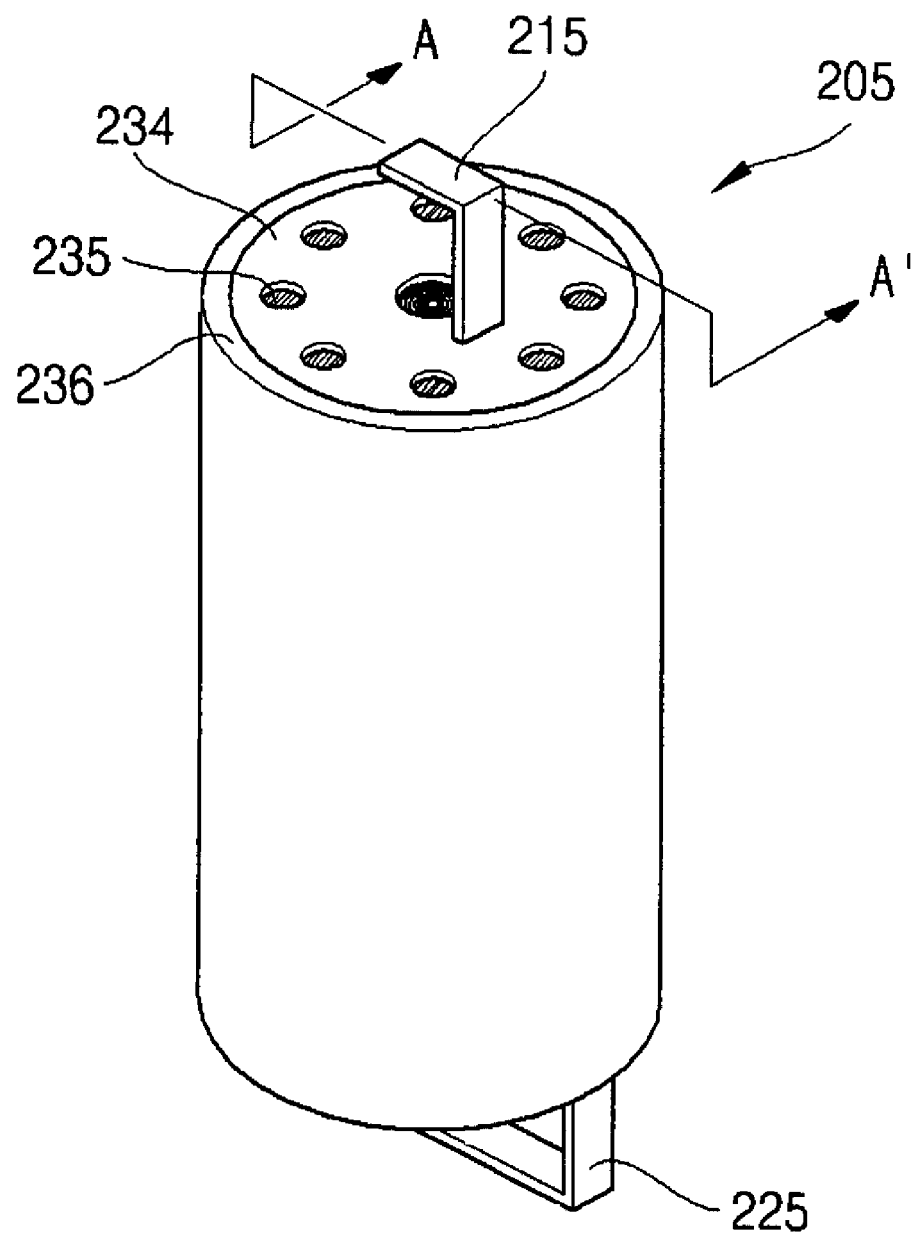
FIG. 2 illustrates a perspective view of an electrode assembly in FIG. 1.
Figure 3:
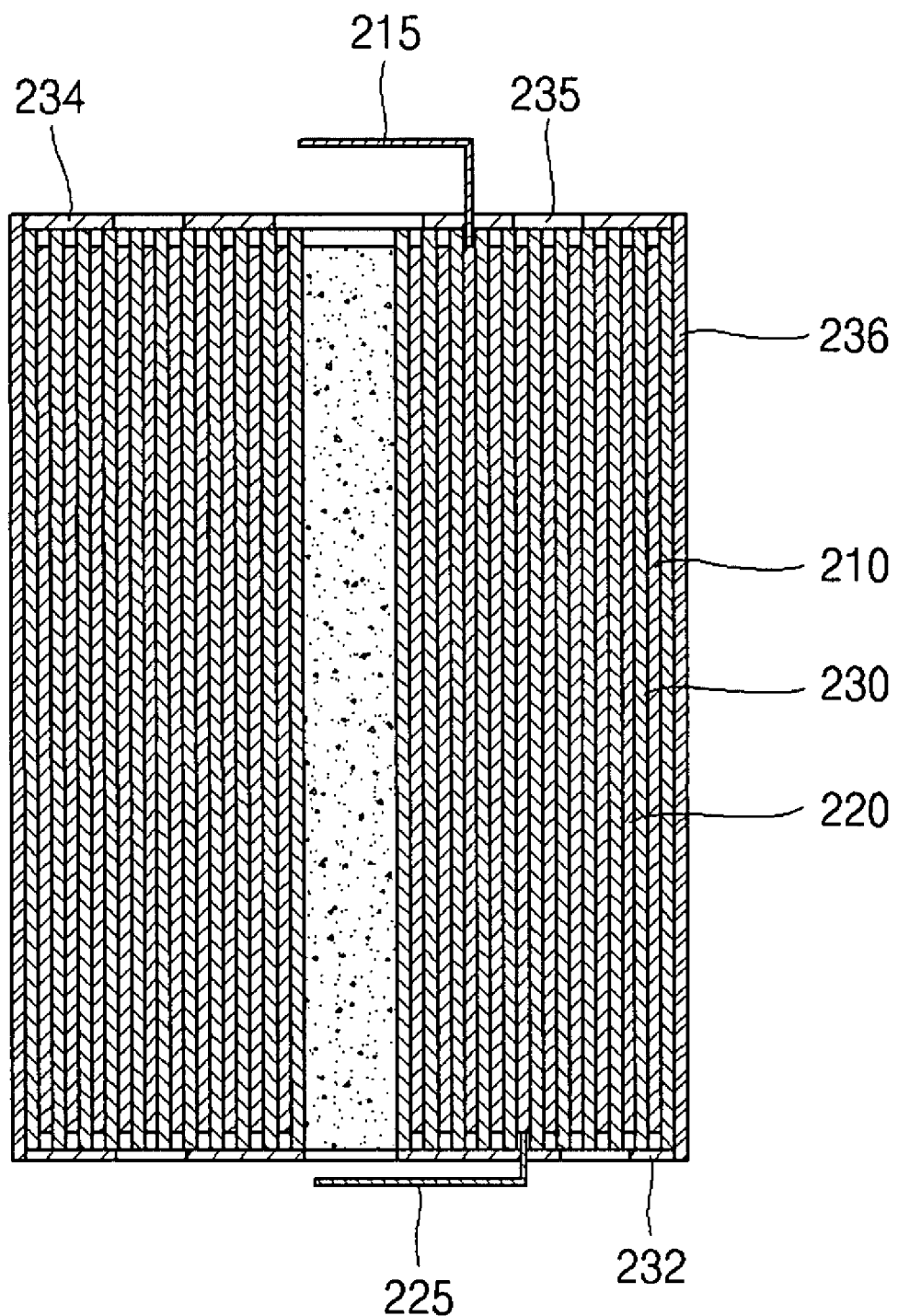
FIG. 3 illustrates an A-A' cross-sectional view of FIG. 2.

FIG. 1 illustrates a longitudinal sectional view of a lithium rechargeable battery according to one exemplary embodiment of the present invention, FIG. 2 illustrates a perspective view of an electrode assembly in FIG. 1, and FIG. 3 illustrates a cross-sectional view thereof along line A-A' of FIG. 2.

Referring to FIG. 1, a lithium rechargeable battery 200 may include an electrode assembly 205, a can 240 and a cap assembly 280. The can 240 may also be referred to as a battery housing 240. The lithium rechargeable battery 200 may be formed in a cylinder shape. However, the shape is not restricted to a cylinder shape and any other shape, e.g., a button shape, may be used.

Referring to FIG. 2 and FIG. 3, the electrode assembly 205 may be formed to include a positive electrode plate 210, a negative electrode plate 220 and a separator 230. A top insulating plate 234 may be placed on the upper part of the electrode assembly 205, and a bottom insulating plate 232 may be placed on the lower part of the electrode assembly 205. Sealing tape 236 may be attached to the circumference of the electrode assembly 205, and the electrode assembly 205 may be formed to include a positive electrode tab 215 and a negative electrode tab 225.

The positive electrode plate 210 may include a positive electrode collector, a positive electrode coating portion and a positive electrode non-coating portion. The positive electrode collector may be formed of a conductive metallic material which may gather electrons from a positive electrode coating portion and transfer them to an external circuit. The positive electrode coating portion may be made by mixing a positive electrode active material, a conductive material and a binder, and the mixture may be coated at a predetermined thickness on the positive electrode collector. In the positive electrode collector, the positive electrode non-coating portion may be the portion in which a positive electrode coating portion is not formed, and the positive electrode tab 215 may be welded to one side of the positive electrode non-coating portion.

The negative electrode plate 220 may include a negative electrode collector, a negative electrode coating portion and a negative electrode non-coating portion. The negative electrode collector may be formed of a conductive metallic material which may gather electrons from a negative electrode coating portion and transfer them to an external circuit.

The negative electrode coating portion may be made by mixing a negative electrode active material, a conductive material and a binder, and the mixture may be coated at a predetermined thickness on the negative electrode collector. In the negative electrode collector, the negative electrode non-coating portion may be the portion in which a negative electrode active material layer is not formed, and the negative electrode tab 225 may be welded to one side of the negative electrode non-coating portion.

The separator 230 may be interposed between the positive electrode plate 210 and the negative electrode plate 220, and the separator 230 may expand or extend to cover the outer circumference of the electrode assembly 205. The separator 230 may serve to prevent a short circuit of the positive electrode plate 210 and the negative electrode plate 220. The separator 230 may be formed of a porous polymer material that may pass lithium ions.

The positive electrode tab 215 and the negative electrode tab 225 may be respectively welded to a positive electrode non-coating portion and a negative electrode non-coating portion, thereby coupling the electrode assembly 205 and another part of the battery. The positive electrode tab 215 and the negative electrode tab 225 may be welded by, e.g., resistance welding, and a lamination tape may be attached to the welded portion to prevent short circuits and heating. The welding method of the positive electrode tab 215 and the negative electrode tab 225 is not limited, and any suitable welding method may be used.

The top insulating plate 234 may be placed between the electrode assembly 205 and the cap assembly 280 to prevent a short circuit. The bottom insulating plate 232 may be placed between the electrode assembly 205 and a lower plate 242 of the can 240, thereby preventing a short circuit. Here, the top insulating plate 234 and the bottom insulating plate 232 may be formed to respectively include an upper surface, a lower surface and a side surface. The upper surface and the lower surface may have a cylinder shape, and the side surface may have a circumferential shape of a flat cylinder.

The top insulating plate 234 and the bottom insulating plate 232 may be made of a polyolefin, e.g., polyethylene (PE), polypropylene (PP), polybutylene (PB), copolymers thereof, etc. Multiple holes 235 may be formed in the top insulating plate 234 and the bottom insulating plate 232. The holes 235 may be a path in which electrolyte may sink to an electrode assembly 205 when injecting electrolyte. As illustrated in FIG. 2, the holes 235 may include a center hole and at least one circumferential hole in a radial shape around the center hole. The number of patterns of the holes 235 is not limited, and any number of holes any suitable pattern may be used. Although seven radial holes 235 are illustrated in FIG. 2, any suitable number of holes may be used.

The top insulating plate 234 and the bottom insulating plate 232 may be fixed to the electrode assembly 205 by utilizing sealing tape 236. The sealing tape 236 may expand or extend to a predetermined length in relation to the height of the electrode assembly 205. The sealing tape 236 may be longer than the thickness of the top insulating plate 234 and the bottom insulating plate 232.

The sealing tape 236 may expand or extend in an upper direction to have substantially the same thickness or extent of the top insulating plate 234, and expand or extend in a lower direction to have substantially the same thickness or extent of the bottom insulating plate 232. The side surfaces of the top insulating plate 234 and the bottom insulating plate 232 may only be attached to the sealing tape 236. The edges of the sealing tape 236 may be substantially flush with the surface of the top insulating plate 234 and the bottom insulating plate 232. The sealing tape 236 may provide a cushioning effect to the top insulating plate 234 and the bottom insulating plate 232 to thus protect the internal battery and electrode structure from shocks and vibrations.

In addition, the sealing tape 236 may be made of a polyolefin, e.g., polyethylene (PE), polypropylene (PP), polybutylene, (PB), copolymers thereof, etc., but the material of the sealing tape 236 is not limited hereto. The sealing tape 236 may be attached to the outermost region of the wound electrode assembly 205 to prevent the electrode assembly 205 from unfastening. The sealing tape 236 may fix the top insulating plate 234 and the bottom insulating plate 232 to an upper and a lower part of an electrode assembly 205.

The can 240 may be formed in a cylindrical shape including a side plate 241 and a lower plate 242. The side plate 241 may include an outer circumference and inner circumference, which may form a concentric circle. The lower plate 242 may include a parallel aligned front surface and a back surface.

An upper part of the can 240 may form a top opening through which an electrode assembly may be inserted, and through which electrolyte may be injected.

A bottom insulating plate 232 may be inserted between the lower plate 242 of the can 240 and the electrode assembly 205 in order to insulate the can 240 and the electrode assembly 205. The upper part of the can 240 may prevent the electrode assembly 205 from moving in the can 240 after the electrode assembly 205 is inserted. A bidding part 244 may be formed to safely seat the cap assembly 280, and a creeping part 243 may be formed to seal the battery after the cap assembly 280 is inserted.

The top insulating plate 234 may be inserted between the upper part of the electrode assembly 205 and the cap assembly 280 to insulate the electrode assembly 205 and the cap assembly 280. The can 240 may be formed of aluminum or an alloy metal which may have light weight and have high malleability, but the material of the can 240 is not limited hereto. The can 240 may be preferably fabricated by, e.g., a deep drawing method, but the fabricating method of the can 240 is not limited hereto.

The cap assembly 280 may include a safety band 261, a current breaking element 272, a secondary protective element 273, and a top cap 274.

The safety band 261 may include a protrusion in the middle of the plate, which may protrude downward and may be positioned in the lower part of the cap assembly 280. The protrusion may transform upward by the pressure generated in the rechargeable battery. The positive electrode tab 215, which may be drawn or extend from the positive electrode plate 210, may be welded to the lower surface of the safety band 261, thereby coupling the safety band 261 and the positive electrode 210 of the electrode assembly 205. The negative electrode tab 225, which may be withdrawn or extend from the negative electrode plate 220, may be welded to the lower plate 242 of the can 240, thereby coupling the negative electrode plate 220 to the can 240. The safety band 261 may deform or explode when a pressure in the can 240 increases, thereby damaging the current breaking element 272.

The current breaking element 272 may be positioned at the upper part of the safety band 261, which may break down and isolate the current when the safety band 261 transforms or deforms. The secondary protective element 273 may be positioned at the upper part of the current breaking element 272, in which current is blocked when overcurrent flows. The conductive top cap 274 may be positioned at the upper part of the secondary protective element 273, which may provide the outside with a positive electrode voltage or a negative electrode voltage. The cap assembly 280 may include a gasket 250 to insulate the cap assembly 280 functioning as the positive electrode and the can 240 functioning as the negative electrode.

As described above, the top insulating plate 234 and the bottom insulating plate 232 of the lithium rechargeable battery 200 may be respectively fixed to the upper part and the lower part of the electrode assembly 205 by sealing tape 236, thereby preventing the electrode assembly 205 from moving when an external impact or vibrations is applied. This cell configuration may thus prevent the upper part and the lower part of the electrode assembly 205 from transforming or deforming.

The fabricating method of a lithium rechargeable battery according to an exemplary embodiment of the present invention will be explained below.

Figure 4:
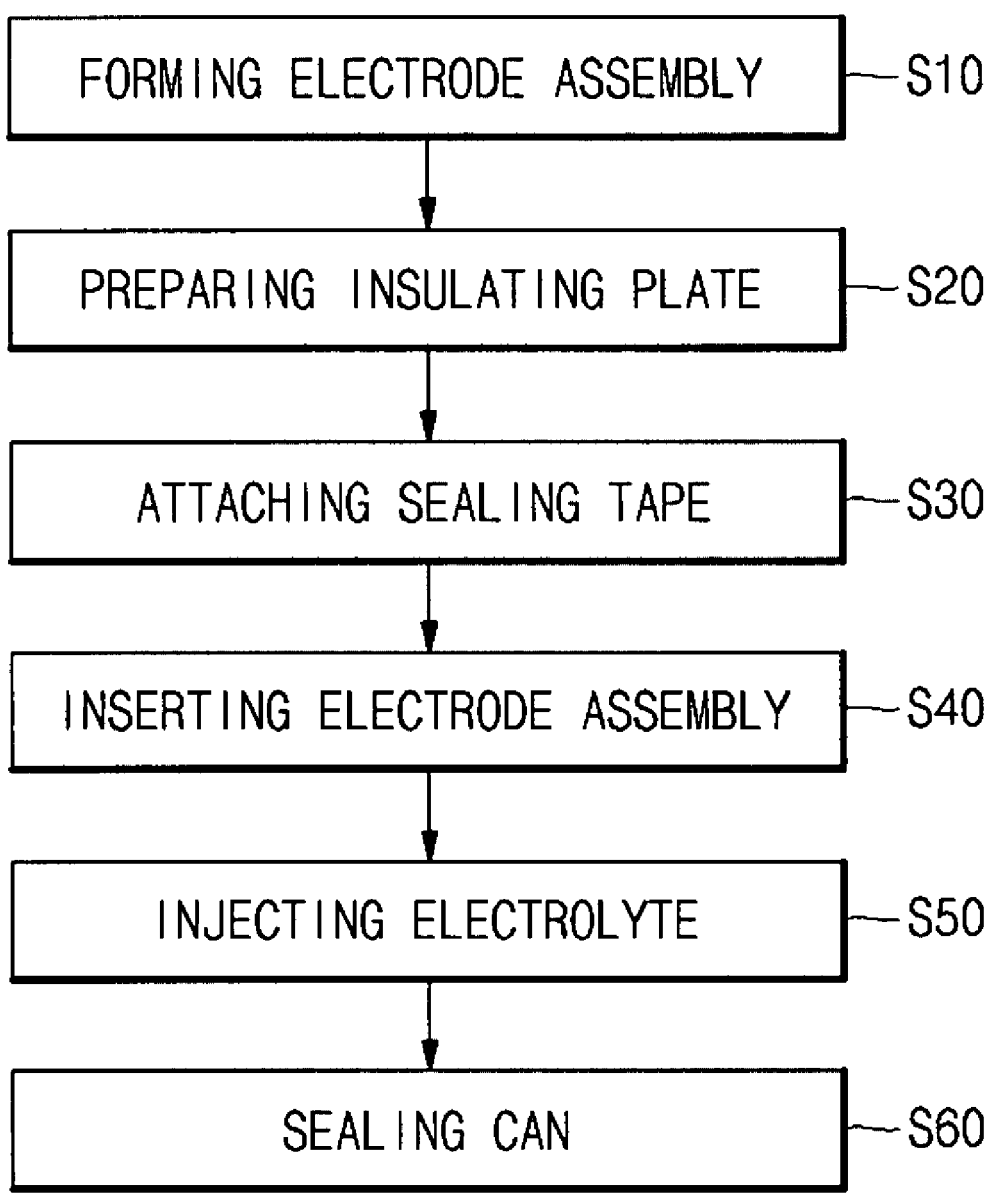
FIG. 4 illustrates a flow chart of stages of a fabricating method of a rechargeable battery according to an exemplary embodiment of the present invention.

FIG. 4 illustrates a flow chart of a fabricating method of a rechargeable battery according to an exemplary embodiment of the present invention. Below, the top insulating plate 234 and the bottom insulating plate 232 will be referred to as insulating plates 234, 232 for convenience.

Referring to FIG. 4, the fabricating method of a lithium rechargeable battery 200 may include stages of forming the electrode assembly (S10), preparing the insulating plate (S20), attaching sealing tape (S30), inserting the electrode assembly (S40), injecting electrolyte (S50), and sealing the can (S60).

The stage of forming the electrode assembly (S10) may include forming the electrode assembly 205 by winding the positive electrode plate 210, the negative electrode plate 220, and the separator 230 into a cylindrical configuration. The positive electrode tab 215 may be attached to the positive electrode non-coating portion of the positive electrode plate 210, and the negative electrode tab 225 may be attached to the negative electrode non-coating portion of the negative electrode plate 220. Then, they may be wound into an electrode assembly 205. The stage of forming the electrode assembly (S10) may be performed by a winding device.

The stage of preparing the insulating plate (S20) may include respectively positioning the top insulating plate 234 and the bottom insulating plate 232 at the upper part and the lower part of the electrode assembly 205.

The stage of attaching the sealing tape (S30) may include attaching the sealing tape 236 to the side of the top insulating plate 234, the side of the bottom insulating plate 232, and circumference of the electrode assembly 205. The sealing tape 236 may be attached to the upper part of the top insulating plate 234 and the lower part of the bottom insulating plate 232. Although not shown in a drawing, sealing tape including multiple holes may be attached in order to help the electrolyte impregnate.

The stage of inserting the electrode assembly (S40) may include inserting the electrode assembly 205 having the sealing tape 236 attached into the inside of the can 240. The top insulating plate 234 and the bottom insulating plate 232 may be respectively attached to the upper part and the lower part of the electrode assembly 205 by the sealing tape 236. That is, it may be preferable, for a simplified process, to insert the electrode assembly 205, which has insulating plates 234, 232 attached to the upper part and the lower part thereof, into the inside of the can 240.

The stage of injecting electrolyte (S50) may include injecting electrolyte into the can 240, in which the electrode assembly 205 has been inserted. To precisely control the amount of electrolyte injected, a method that measures the weight before and after of electrolyte injection may be used.

The stage of sealing the can (S60) may include sealing the upper opening of the can 240 with a cap assembly 280. Because the positive electrode tab 215 may be smeared or coated with electrolyte when electrolyte is injected during stage (S50) of injecting the electrolyte, the positive electrode tab 215 may be cleaned and then welded to the lower part of the safety band 261. The creeping part 243 may be formed on the uppermost part of the can 240 to secure a hermetic seal, which may be followed by sealing the upper opening with the cap assembly 280.

Next, operation of a lithium rechargeable battery according to an exemplary embodiment of the present invention will be explained.

Referring to FIG. 1, the lithium rechargeable battery 200 may include the electrode assembly 205 in which the top insulating plate 234 and the bottom insulating plate 232 may be respectively fixed to the upper part and the lower part thereof by sealing tape 236.

When the lithium rechargeable battery 200 passes through a drum test or is used for electric tools, the lithium rechargeable battery may receive substantial rotary power and/or vibrations from outside, and this rotary power and/or vibrations may be delivered to the electrode assembly 205 inserted inside the can 240.

When the top insulating plate 234 and the bottom insulating plate 232 are respectively fixed to the upper part and the lower part of the electrode assembly 205 by sealing tape 236, the top insulating plate 234 and the bottom insulating plate 232 may play the role of a buffer to prevent the upper part and the lower part of the electrode assembly 205 from moving, deforming, and/or transforming.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An electrode assembly for a rechargeable battery, comprising:
an assembly including:
a positive electrode plate,
a negative electrode plate, and
a separator between the positive electrode plate and the negative electrode plate, the assembly having an outer circumference including the separator;
at least one insulating plate positioned on at least one of an upper part or a lower part of the assembly, the at least one insulating plate including an upper surface, a lower surface, and an outer side surface between the upper and lower surfaces; and
a sealing tape attached to substantially the entire outer circumference of the assembly and to substantially the entire outer side surface of the at least one insulating plate, the sealing tape being directly on the separator, and the at least one insulating plate being fixed in the electrode assembly by the sealing tape.

2. The electrode assembly for a rechargeable battery as claimed in claim 1, wherein:
the at least one insulating plate includes a first insulating plate positioned on the upper part of the assembly and a second insulating plate positioned on the lower part of the assembly,
a first end of the sealing tape extends as far as a thickness of the first insulating plate, and
a second end of the sealing tape extends as much as the thickness of the second insulating plate.

3. The electrode assembly for a rechargeable battery as claimed in claim 1, wherein a plurality of holes is formed in the at least one insulating plate.

4. The electrode assembly for a rechargeable battery as claimed in claim 1, wherein the electrode assembly has a cylindrical shape.

5. The electrode assembly for a rechargeable battery as claimed in claim 1, wherein the at least one insulating plate is formed from polyolefin.

6. A rechargeable battery, comprising:
an electrode assembly including a separator between at least two electrodes, and an outer circumference of the electrode assembly including the separator;
a battery housing receiving the electrode assembly;
a cap assembly sealing the battery housing;
at least one insulating plate positioned on at least one of an upper part or a lower part of the electrode assembly, the at least one insulating plate including an upper surface, a lower surface, and an outer side surface between the upper and lower surfaces; and
a sealing tape attached to substantially the entire outer circumference of the electrode assembly and to substantially the entire outer side surface of the at least one insulating plate, the sealing tape being directly on the separator, and the at least one insulating plate being fixed to the electrode assembly by the sealing tape.

7. The rechargeable battery as claimed in claim 6, wherein:
the at least one insulating plate includes a first insulating plate positioned on the upper part of the electrode assembly and a second insulating plate positioned on the lower part of the electrode assembly,
a first end of the sealing tape extends at least as much as a thickness of the first insulating plate, and a second end of the sealing tape extends at least as much as a thickness of the second insulating plate.

8. The rechargeable battery as claimed in claim 6, wherein a plurality of holes is formed in the at least one insulating plate.

9. The rechargeable battery as claimed in claim 6, wherein the rechargeable battery has a cylindrical shape.

10. The rechargeable battery as claimed in claim 6, wherein the at least one insulating plate is formed from polyolefin.

11. A method of fabricating a rechargeable battery, comprising:
   forming an electrode assembly by winding a separator between at least two electrodes, an outer circumference of the electrode assembly including the separator;
   positioning at least one insulating plate on at least one of an upper part or a lower part of the electrode assembly after forming the electrode assembly, the at least one insulating plate including an upper surface, a lower surface, and an outer side surface between the upper and lower surfaces;
   affixing the at least one insulating plate to the electrode assembly, after positioning the at least one insulating plate, by attaching a sealing tape to substantially the entire outer side surface of the at least one insulating plate and to substantially the entire outer circumference of the electrode assembly;
   inserting the electrode assembly and the at least one insulating plate having the sealing tape attached thereto into a battery housing;
   injecting an electrolyte into the battery housing; and
   sealing the battery housing by sealing an upper opening of the battery housing with a cap assembly.

12. The method of fabricating a rechargeable battery as claimed in claim 11, wherein a plurality of holes is formed in the at least one insulating plate.

13. The method of fabricating a rechargeable battery as claimed in claim 11, wherein the rechargeable battery has a cylindrical shape.

14. The method of fabricating a rechargeable battery as claimed in claim 11, wherein the at least one insulating plate is formed from polyolefin.

15. The rechargeable battery as claimed in claim 6, wherein a lateral end of the sealing tape is in direct contact with the outer side surface of the at least one insulating plate.

16. The rechargeable battery as claimed in claim 15, wherein:
   the lower surface of the at least one insulating plate faces the electrode assembly, and
   the lateral end of the sealing tape is horizontally aligned with the upper surface of the at least one insulating plate.

17. The electrode assembly for a rechargeable battery as claimed in claim 1, wherein a lateral end of the sealing tape is in direct contact with the outer side surface of the at least one insulating plate.

18. The electrode assembly for a rechargeable battery as claimed in claim 17, wherein:
   the lower surface of the at least one insulating plate faces the assembly, and
   the lateral end of the sealing tape is horizontal aligned with the upper surface of the at least one insulating plate.

* * * * *